(12) United States Patent
Vaganov et al.

(10) Patent No.: US 7,880,247 B2
(45) Date of Patent: Feb. 1, 2011

(54) SEMICONDUCTOR INPUT CONTROL DEVICE

(76) Inventors: Vladimir Vaganov, 129 El Porton, Los Gatos, CA (US) 95032; Nickolai Belov, 118 Plazoleta, Los Gatos, CA (US) 95032

(*) Notice: Subject to any disclaimer, the term of this patent is extended or adjusted under 35 U.S.C. 154(b) by 187 days.

(21) Appl. No.: 12/342,001

(22) Filed: Dec. 22, 2008

(65) Prior Publication Data

US 2009/0212377 A1 Aug. 27, 2009

Related U.S. Application Data (63) Continuation-in-part of application No. 11/804,954, filed on May 21, 2007, now Pat. No. 7,476,952, and a continuation-in-part of application No. 11/025,642, filed on Dec. 28, 2004, now Pat. No. 7,554,167.

(60) Provisional application No. 60/802,276, filed on May 22, 2006, provisional application No. 60/533,409, filed on Dec. 29, 2003.

(51) Int. Cl.
*H01L 23/04* (2006.01)
*H01L 23/48* (2006.01)
*H01L 23/52* (2006.01)
*H01L 23/28* (2006.01)

(52) U.S. Cl. .................. 257/415; 257/730; 257/778; 257/787; 257/E23.123; 257/E23.124

(58) Field of Classification Search .................. None
See application file for complete search history.

(56) References Cited

U.S. PATENT DOCUMENTS

| 4,680,577 A | 7/1987 | Straayer et al. |
| 4,891,985 A * | 1/1990 | Glenn ..................... 73/514.38 |
| 4,967,605 A | 11/1990 | Okada |
| 5,035,148 A | 7/1991 | Okada |
| 5,263,375 A | 11/1993 | Okada |

(Continued)

FOREIGN PATENT DOCUMENTS

JP 2007010379 1/2007

(Continued)

OTHER PUBLICATIONS

Int'l Searching Authority, *International Search Report and Written Opinion of the International Searching Authority* for PCTUS0711988 mailed Jul. 28, 2008.

(Continued)

*Primary Examiner*—Scott B Geyer
(74) *Attorney, Agent, or Firm*—Fitch, Even, Tabin & Flannery (57) ABSTRACT

A force input control device suitable for high-volume applications such as cell phones, portable gaming devices and other handheld electronic devices along with other applications like medical equipment, robotics, security systems and wireless sensor networks is disclosed. The device can be one-axis or two-axis or three-axis sensitive broadening the range of applications. The device comprises a force sensor die formed within semiconductor substrate and containing a force sensor providing electrical output signal in response to applied external force, and electrical connection elements for mounting and/or wire bonding. Signal conditioning and processing integrated circuit can be integrated within some devices. A package enclosing at least a portion of the force sensor die and comprising a force-transferring element cooperated with the sensor die for transferring an external force to the force sensor die.

24 Claims, 5 Drawing Sheets

U.S. PATENT DOCUMENTS

| | | | |
|---|---|---|---|
| 5,489,900 | A | 2/1996 | Cali et al. |
| 5,499,041 | A | 3/1996 | Brandenburg et al. |
| 5,600,074 | A * | 2/1997 | Marek et al. ........... 73/862.625 |
| 5,640,178 | A | 6/1997 | Endo et al. |
| 5,703,393 | A * | 12/1997 | Yamaguchi ................ 257/419 |
| 5,760,313 | A * | 6/1998 | Guentner et al. ....... 73/862.584 |
| 6,121,954 | A | 9/2000 | Seffernick |
| 6,195,082 | B1 | 2/2001 | May et al. |
| 6,211,558 | B1 * | 4/2001 | Ismail et al. ................ 257/419 |
| 6,369,435 | B1 | 4/2002 | Igel |
| 6,373,265 | B1 | 4/2002 | Morimoto et al. |
| 6,388,299 | B1 * | 5/2002 | Kang et al. ................ 257/415 |
| 6,441,503 | B1 * | 8/2002 | Webster ...................... 257/787 |
| 6,477,903 | B2 | 11/2002 | Okada |
| 6,518,954 | B1 | 2/2003 | Chen |
| 6,523,423 | B1 | 2/2003 | Namerikawa et al. |
| 6,530,283 | B2 | 3/2003 | Okada et al. |
| 6,534,711 | B1 * | 3/2003 | Pollack ....................... 174/529 |
| 6,570,556 | B1 | 5/2003 | Liao et al. |
| 6,642,857 | B1 * | 11/2003 | Schediwy et al. ............. 341/20 |
| 6,654,004 | B2 | 11/2003 | Hoggarth |
| 6,654,005 | B2 | 11/2003 | Wang |
| 6,697,049 | B2 | 2/2004 | Lu |
| 6,707,445 | B1 | 3/2004 | Hasemann |
| 6,750,408 | B2 | 6/2004 | Inoue et al. |
| 6,753,850 | B2 | 6/2004 | Poole |
| 6,771,992 | B1 | 8/2004 | Tomura et al. |
| 6,774,887 | B2 | 8/2004 | Lu |
| 6,787,865 | B2 * | 9/2004 | Endo et al. .................. 257/414 |
| 6,788,291 | B2 | 9/2004 | Burry |
| 6,791,532 | B2 | 9/2004 | Hirano et al. |
| 6,809,529 | B2 | 10/2004 | Okada et al. |
| 6,809,721 | B2 | 10/2004 | Love |
| 6,859,048 | B2 | 2/2005 | Okada et al. |
| 6,903,724 | B2 | 6/2005 | Grivas et al. |
| 6,920,041 | B2 | 7/2005 | Oross et al. |
| 6,940,495 | B2 | 9/2005 | Morimoto et al. |
| 6,950,092 | B2 | 9/2005 | Buss |
| 6,952,197 | B1 | 10/2005 | Nakamura et al. |
| 7,123,028 | B2 | 10/2006 | Okada et al. |
| 7,123,240 | B2 | 10/2006 | Kemppinen |
| 7,262,071 | B2 * | 8/2007 | Larmer et al. ................. 438/53 |
| 7,273,767 | B2 * | 9/2007 | Ong et al. ................... 438/113 |
| 7,476,952 | B2 | 1/2009 | Vagonov et al. |
| 7,554,167 | B2 | 6/2009 | Vaganov |
| 2001/0003326 | A1 | 6/2001 | Okada et al. |
| 2002/0075234 | A1 | 6/2002 | Poole |
| 2002/0149564 | A1 | 10/2002 | Simpson et al. |
| 2002/0151282 | A1 | 10/2002 | Wang |
| 2002/0190949 | A1 | 12/2002 | Hirano et al. |
| 2003/0030452 | A1 | 2/2003 | Okada |
| 2003/0052861 | A1 | 3/2003 | Peng |
| 2003/0076302 | A1 | 4/2003 | Langstraat |
| 2003/0094663 | A1 * | 5/2003 | Sato et al. ................... 257/414 |
| 2003/0105576 | A1 | 6/2003 | Kamiya et al. |
| 2004/0027331 | A1 | 2/2004 | Mochizuki et al. |
| 2004/0222968 | A1 | 11/2004 | Endo |
| 2004/0227732 | A1 | 11/2004 | Kemppinnen |
| 2005/0178214 | A1 | 8/2005 | Okada et al. |
| 2005/0190152 | A1 * | 9/2005 | Vaganov ..................... 345/157 |
| 2005/0217386 | A1 | 10/2005 | Hirose et al. |
| 2007/0245836 | A1 | 10/2007 | Vaganov |
| 2007/0264743 | A1 | 11/2007 | Vaganov et al. |
| 2008/0105936 | A1 * | 5/2008 | Nakamura .................. 257/415 |

OTHER PUBLICATIONS

U.S.P.T.O., *Office Action* from U.S. Appl. No. 11/025,642 mailed Aug. 28, 2008.

U.S.P.T.O., *Notice of Allowance* for U.S. Appl. No. 11/804,954 mailed Sep. 4, 2008.

Vaganov, Vladimir, "U.S. Appl. No. 11/025,642".

Vaganov, Vladimir, "U.S. Appl. No. 11/649,992".

Vaganov, Vladimir, "U.S. Appl. No. 11/804,954".

*Notice of Allowance* from U.S. Appl. No. 11/025,642 mailed Feb. 23, 2009.

Patent Cooperation Treaty; "International Search Report" for PCT/US2009/069091; issued Aug. 17, 2010; 3 pages (87000).

Non Final Office Action from 12477076 mailed Nov. 4, 2010 (95527).

* cited by examiner

SEMICONDUCTOR INPUT CONTROL DEVICE

PRIORITY CLAIM

This application is a Continuation-In-Part to patent application Ser. No. 11/804,954, entitled SEMICONDUCTOR INPUT CONTROL DEVICE and filed on May 21, 2007, which is:

a Continuation-In-Part of U.S. patent application Ser. No. 11/025,642, entitled THREE-DIMENSIONAL ANALOG INPUT CONTROL DEVICE, filed on Dec. 28, 2004, which claims the benefit of Provisional Application No. 60/533,409, entitled THREE-DIMENSIONAL ANALOG INPUT POINTING MICRO-DEVICE, filed Dec. 29, 2003; and further claims the benefit of U.S. Provisional Application No. 60/802,276, entitled SEMICONDUCTOR INPUT CONTROL DEVICE, filed May 22, 2006, where all of the above identified applications are incorporated herein by reference in their entireties.

BACKGROUND

1. Field of the Invention

This invention relates to semiconductor input control devices, Micro Electro Mechanical Systems (MEMS), sensors and more specifically to one-axis or two-axis or three-axis force sensors for multiple applications and in particular for finger-mouse and micro-joysticks for consumer and other applications.

2. Background

The one-axis, two-axis and three-axis force sensors based on micromachined silicon chips with stress sensitive components on the flexible diaphragm are known. Prior art uses silicon chip with stress sensitive components bonded to metal elastic element with metal rod or pin for application of an external force. The packages for these force sensors are generally complex, large and expensive.

However there is a need for one-axis, two-axis and three-axis input force control devices, which are low cost, small, reliable, stable, provide selected ratios between X,Y or X,Y,Z sensitivities, low cross axis sensitivity, process integration with CMOS, scaling, convenient solutions for applying an external force, selectable combination of applied force and deflection and manufacturability for high volume applications. The examples of this are consumer markets and applications such as cell phones, portable gamers, digital cameras, etc, using user tactile force inputs as part of the user interface.

SUMMARY OF THE PRESENT EMBODIMENTS

A low-cost force input control device suitable for high-volume applications such as cell phones, portable gaming devices and other handheld electronic devices is disclosed.

This device comprises a force sensor die formed within semiconductor substrate and containing: a force-application area; at least one force sensor providing electrical output signals in response to an external force applied to the force-application area; at least one signal conditioning and processing integrated circuit providing conditioning and processing of the output signals from the force sensor; a package enclosing at least a portion of the force sensor die and comprising a force-transferring element coupled to the sensor die for transferring an external force to the force sensor die; and a button mechanically coupled to the force-transferring element of the package for providing an interface with the external force.

Some embodiments provide for a semiconductor input control device for inputting mechanical signals into an electronic system comprising: a force sensor die formed within a semiconductor substrate, the force sensor die comprising side one and side two, electrical connection elements, a force-application area, and at least one force sensor providing electrical output signals in response to an external force applied to the force-application area; and a package enclosing at least part of the force sensor die, the package comprising a force-transferring element that transfers an external force to the force sensor die; wherein the electrical connection elements are located on the side one of the force sensor die, the force-application area is located on the side two of the force sensor die and the force-transferring element is coupled to the force application area on the side two of the force sensor die.

Other embodiments provide semiconductor input control devices for inputting mechanical signals into an electronic system comprising: a force sensor die formed within a semiconductor substrate, the force sensor die comprises side one and side two, electrical connection elements, force-application area and at least one force sensor providing electrical output signals in response to an external force applied to the force-application area; a package enclosing at least part of the force sensor die; and a force-transferring element cooperated with the force-application area, where the force transferring element transfers an external force to the force sensor die; wherein the electrical connection elements and force-application area of the force-sensor die are located on the side one of the force sensor die and the force-transferring element is in contact with the force application area on the side one of the force sensor die when the external force is applied.

Still further embodiments provide semiconductor input control devices for inputting mechanical signals into an electronic system comprising: a force sensor die formed within a semiconductor substrate, the force sensor die comprising side one and side two, electrical connection elements, a force-application area and at least one force sensor providing electrical output signals in response to an external force applied to the force-application area; transistor integrated circuit formed within a semiconductor substrate, the transistor integrated circuit being electrically coupled with the at least one force sensors to receive the electrical signals; a package enclosing at least part of the force sensor die; and a force-transferring element that is cooperated with the force sensor die, where the force-transferring element transfers an external force to the force sensor die; wherein the transistor integrated circuit provides signal conditioning and signal processing of the electrical output signals from the at least one force sensor.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide, in part, one-axis or two-axis or three-axis force input control devices for high volume consumer markets, such as cell phones, portable gamers, remote controls, PDA, digital cameras, etc. Further, the present embodiments provide packaging solutions for one-axis or two-axis or three-axis force input control of different functions in electronic consumer devices. Additionally, the present embodiments provide low cost one-axis or two-axis or three-axis force input control devices. Furthermore, the present embodiments provide small size one-axis or two-axis or three-axis force input control devices. Still further, the present embodiments provide high reliability one-axis or two-axis or three-axis force input control devices.

The present embodiments further provide high stability one-axis or two-axis or three-axis force input control device. Additionally, the present embodiments provide one-axis or two-axis or three-axis force input control devices, which is scalable. Further, the present embodiments provide one-axis or two-axis or three-axis force input control devices, which allows convenient solutions for applying an external force.

FIGS. 1-10 show various embodiments of force input control devices, their different options of packaging, assembling and mounting. The detailed description of the devices according to the present embodiments is presented below in six embodiments. The present invention is not limited to these six embodiments, and the six embodiments are provided as representations of the inventive aspects of the present invention. Further, features and aspects of the below described embodiments can be interchanged without departing from the present invention. While the invention disclosed below is described by means of specific embodiments and applications thereof, numerous modifications and variations could be made thereto by those skilled in the art without departing from the scope of the invention set forth in the claims.

First Embodiment

Figure 1:
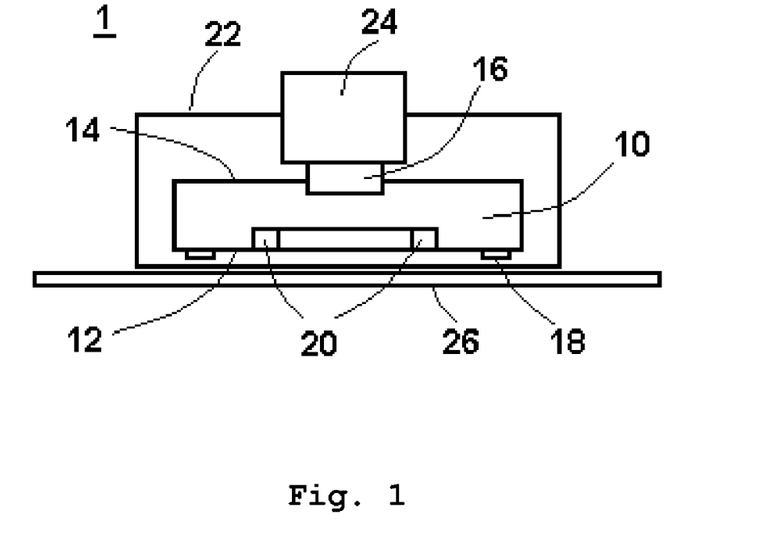
FIG. 1 is a view of a force input control device with electrical connection elements located on the side one, force-application area located on the side two of the force sensor die and the force-transferring element coupled to the force application area on the side two of the force sensor die.

An example of an input control device 1 according to the first embodiment is shown in FIG. 1. The input control device 1 contains a package 22, a semiconductor force sensor die 10, and a force-transferring element 24. The force sensor die 10 formed within a semiconductor substrate has side one (12) and side two (14), has electrical connection elements 18, force-application area 16 and contains at least one force sensor 20 providing electrical output signals in response to an external force applied to the force-application area 16. Side one (12) is opposite side two (14).

In another version of the input control device 1, the force sensor die 10 has an additional force-transferring element coupled to both the force-transferring element 24 of the package 22 and to the force-application area 16 for better and multi-axis sensitivity of the input control device 1.

The force-transferring element 24 coupled to the force sensor die 10 can be made from substantially any relevant material that allows an external force to be transferred to the force sensor die 10. For example, the force-transferring element 24 can be constructed from: metal, alloy, plastic, rubber, silicon, ceramic, glass, combinations of the above and/or other such relevant materials. Additionally, the force-transfer element 24 might be constructed to have different structures, like one layer uniform material, at least two layers of uniform materials, non-uniform material with gradient of hardness or combination of the above.

The electrical connection elements 18 can be metal pads with under-bump metallization, solder balls or solder bumps, or other such structures that allow the input control device 1 to be mounted and electrically coupled with, for example, a printed circuit board 26. The electrical connection elements 18, in some implementations, allow flip-chip mounting of the force sensor die 10 within the package 22. Additional materials and structures can be used at the interface between the force sensor die 10 and the package 22 in order to provide mechanical strength of the connection between the force sensor die 10 and the package 22. For example, underfill, additional adhesive, frit glass or other structural material can be used; additional dummy solder joints can be utilized, mating mechanical structures can be formed on the connecting surfaces, for example die can be placed in a cavity formed in the package 22, etc.

As introduced above, the input control device 1 is mounted on a printed circuit board (PCB) 26 or other substrate within an electronic system.

Some of the advantageous features of the force input control device 1 according to the first embodiment is that electrical connection elements 18 and at least one force sensor 20 are located on the side one (12), force-application area 16 is located on the side two (14) of the force sensor die 10 and the force-transferring element 24 is coupled to the force application area 16 on the side two 14 of the force sensor die 10.

When an external force is applied to the force-transferring element 24 of the package 22 it is transferred to the force-application area 16 of the force sensor die 10. The force sensor die 10 provides output signals in response to the applied force. These signals can be used as an input in an electronic system. For example, the output signals of the force sensor die 10, transmitted through one or more of the electrical connector elements 18, can be used for cursor position control on a screen of a cell phone, control of motion or actions of a character in a gaming device, monitoring a patient, control of sport equipment, etc. Output signals of the force sensor die 10 can carry information to allow one-axis or two-axis or three-axis or more complex control of a cursor or other object at user interface. In general case for sensing N components of the external force vector (N=1, 2 or 3), the input control device 1 typically includes at least N force sensors, which provide independent electrical output signals containing information about N components of the external force vector.

The force sensors 20, providing electrical output signals in response to an external force transferred and applied to the force-application area 16, can be chosen from, but is not limited to, the group of: a piezoresistor, a pn-junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit, a piezoelectric sensor, a capacitor, a differential capacitor, a capacitive bridge, a magnetic sensor, an electromagnetic sensor, a magneto-electric sensor, an optical sensor, a pair of radiation emitting and radiation sensitive component, a vibration sensor, an acoustic wave sensor, a thermal sensor, a heat transfer sensor or combination, and/or other such relevant devices.

In many cases, electrical signals provided by the force sensors 20 are processed. This processing can include signal conditioning and signal processing. Signal conditioning can include, but is not limited to, compensation of temperature-related measurement errors, amplification, compensation of non-linearity, digitizing output signals of the force sensor die or transforming them into frequency. Preferably, signal processing is done in digital form although analog processing also can be used. Signal processing can include multiplexing of signals from different force sensors, calculating either some components or all components or modulus of the force vector applied to the input control device by digital processing of the signals, providing correction of sensor parameters as, for example, offset and sensitivity and other operations. Signal conditioning and processing electronics can also include circuits for wireless transferring signals. Signal conditioning and processing typically employs the use of integrated circuits utilizing transistors, which are sometimes referred later herein as "transistor integrated circuits".

In the input control device 1, according to some implementations of the first embodiment, at least some signal conditioning and processing circuits are integrated on the force sensor die 10.

Second Embodiment

Figure 2:
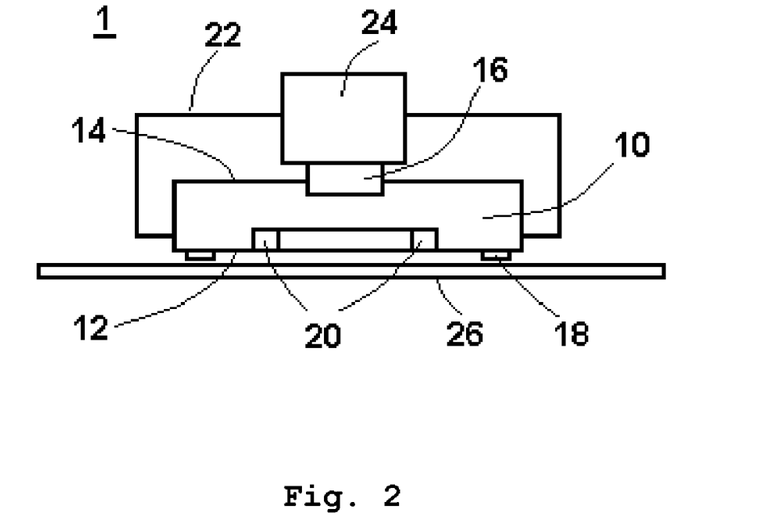
FIG. 2 is a view of an input control device with electrical connection elements of the force sensor die exposed for direct mounting of the semiconductor input control device within an electronic system.

FIG. 2 depicts a variation of the input control device 1 of FIG. 1. In this embodiment, a package 22 is enclosing a part of the force sensor die 10 leaving a portion of the force sensor die 10 proximate the side one 12 exposed, and further comprises a force-transferring element 24, which transfers an external force to the force-application area 16. The electrical connection elements 18 are exposed, for example, for a direct flip chip mounting to the PCB 26.

Third Embodiment

Figure 3:
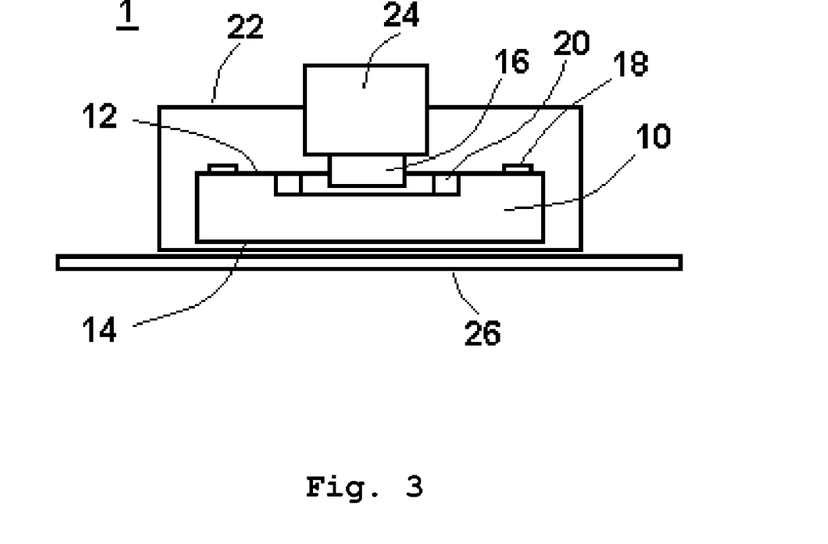
FIG. 3 is a view of force input control device with electrical connection elements and force-application area of the force-sensor die located on the side one of the force sensor die and the force-transferring element coupled to the force application area on the side one of the force sensor die.

An input control device 1 according to the third embodiment is shown in FIG. 3. The input device 1 contains a package 22, a semiconductor force sensor die 10, and a force-transferring element 24. The force sensor die 10 formed within a semiconductor substrate has side one (12) and side two (14), has electrical connection elements 18, force-application area 16 and contains at least one force sensor 20 providing electrical output signals in response to an external force applied to the force-application area 16. Typically, metal pads are used as the electrical connection elements 18. The electrical connection elements allow wire bonding of the force sensor die 10. The input control device 1 is mounted on a printed circuit board (PCB) 26 or other substrate within an electronic system.

Some of the feature of the input control device 1 according to the embodiment depicted in FIG. 3 is that electrical connection elements 18, and at least one force sensor 20 and force-application area 16 are located on the side one (12) of the force sensor die 10 and the force-transferring element 24 is coupled to the force application area 16 also on the side one of the force sensor die 10.

Figure 4:
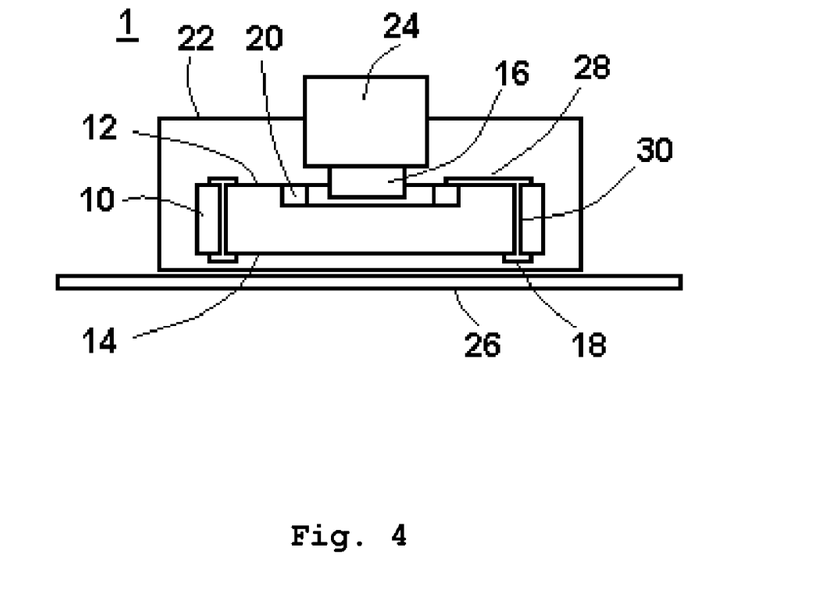
FIG. 4 is a view of an input control device with through silicon vias in the force sensor die.

In this third embodiment of the input control device 1, the electrical connection elements 18 can be used for wire bonding within the package 22. If for some applications the flip chip mounting of the force sensor die within the package is required, then the version of the input control device 1 shown in FIG. 4 can be used. FIG. 4 illustrates the input control device 1, where the force sensor die 10 has at least one force sensor 20, electrical connections 28 to these sensors 20 and force-application area 16 located proximate the side one (12) of the force sensor die 10. Electrical connection elements 18 are located on side two (14) of the force sensor die 10 and electrically connected with the connections 28, for example, by through silicon vias (TSV) 30.

Fourth Embodiment

Figure 5:
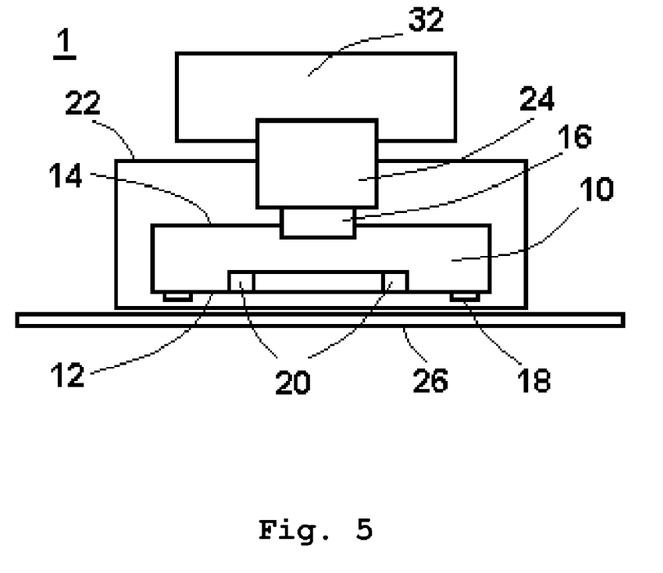
FIG. 5 is a view of an input control device with a button, which provides an interface with the external force and transfers it to the force-transferring element.

An input control device 1 according to the fourth embodiment is shown in FIG. 5. The input device 1 contains a package 22, a semiconductor force sensor die 10, a force-transferring element 24 and a button 32. The force sensor die 10 formed within a semiconductor substrate has side one (12) and side two (14), has electrical connection elements 18, and force-application area 16. At least one force sensor 20 is formed within the force sensor die. The force sensor 20 provides electrical output signals in response to an external force applied to the force-application area 16. As it was discussed above, either metal pads, solder bumps, solder balls or other relevant electrically conductive structures are used as the electrical connection elements 18. Typically, the electrical connection elements 18 allow flip-chip mounting of the force sensor die 10. The input control device 1 is mounted on a printed circuit board (PCB) 26 or other substrate within electronic system.

Although it is obvious that an external force can be applied directly to the force-transferring element 24 of the package, an external button 32 is often used for practical purposes. The button 32 is connected to the force-transferring element 24 of the package 22. The button 32 can be made from substantially any relevant material, such as but not limited to, plastic, metal, ceramic, glass, polymer, gem, other such relevant materials or combinations of the above. The button 32 can have different shapes and elements, such as convex, concave, saddle, cylinder, disk, dome, stick, hemisphere, cone, pyramid, prism, tore, dimple, notch, tactile recognizable feature, and other such features or combinations. Both the package 22 and the button 32 can have profiled connector elements, which provide reliable connection between the button and the package 22. In particular, the force-transferring element 24 and the button 32 can be coupled across a surface having a shape of hole, cavity, trench, notch, pole, pin, rim, step, bar, thread, tooth, hook, or combination of the above. In a version of the input control device 1, profiled connectors formed in the button 32 and force-transferring element 24 have a locking mechanism. Profiled connector elements also can provide protection of the force sensor die 10 from both force and torque overload. Button 32 is designed ergonomically to provide the maximum convenience for the user providing preferable material, shape, size, range of the force required to operate the input device, stiffness, maximum deformation, feeling in touch, and color. Input control device 1 can be a part of a keyboard, key-mat, control panel, control surface area or the like. Buttons also can be replaceable and interchangeable.

When an external force is applied to the button 32, for example by a finger, it is transferred to the force sensor 20 through the force-transferring element 24 and the force-application area 16 of the force sensor die 10. The force sensor die 10 provides output signals in response to the applied force. These signals are used as an input in an electronic system. Output signals of the force sensor die 10 can have multiple components and can allow, for example, one-axis or two-axis or three-axis control of a gaming character or other object at the user interface.

Fifth Embodiment

Figure 6:
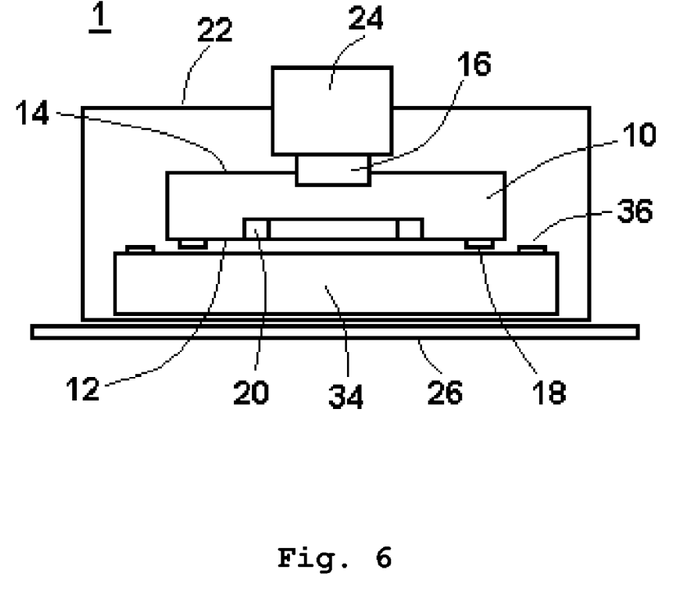
FIG. 6 is a view of an input control device with a force sensor die flip chip mounted on the top of a transistor integrated circuit providing signal conditioning and signal processing of the electrical output signals from the force sensors.
Figure 7:
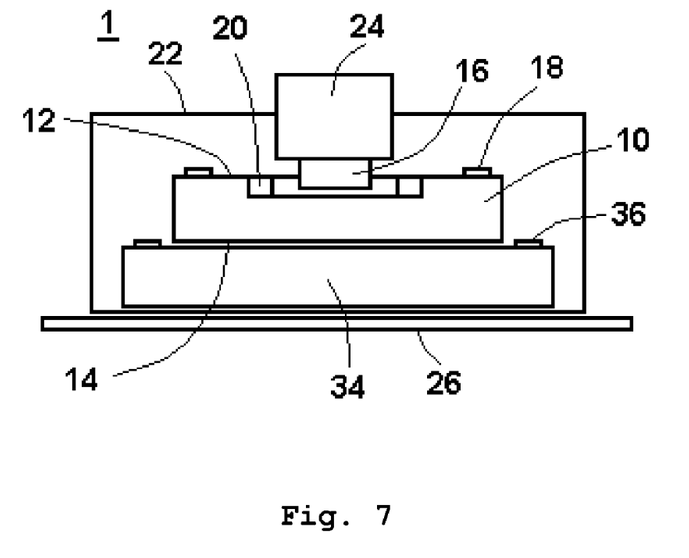
FIG. 7 is a view of an input control device with a force sensor die mounted for wire bonding on the top of a transistor integrated circuit providing signal conditioning and signal processing of the electrical output signals from the force sensors.

FIGS. 6 and 7 show examples of input control device 1 according to the fifth embodiment. The input device 1 contains a package 22, a semiconductor force sensor die 10, a force-transferring element 24 and a second semiconductor die 34. The force sensor die 10 formed within a semiconductor substrate has side one (12) and side two (14), has electrical connection elements 18 and force-application area 16. At least one force sensor 20 is formed within the force sensor die 10. The force sensor 20 provides electrical output signals in response to an external force applied to the force-application area 16.

The second semiconductor die 34 contains transistor integrated circuits for signal conditioning and/or signal processing of the output signals of the force sensors 20. Reasons for using signal conditioning and signal processing integrated circuits are discussed above in the description of the first embodiment. The transistor integrated circuits can be substantially any relevant circuitry such as, but not limited to, CMOS, bipolar, biCMOS and/or other such relevant circuitry.

In general, partitioning between force sensing, signal conditioning and signal processing functions can be different. Force sensing, signal conditioning and signal processing functions can be integrated within one force sensor die 10. In this case only one die is needed. Another option is integration of force sensing and at least some signal conditioning within force sensor die 10 and at least signal processing within second semiconductor die 34. Still another option is integration of force sensing within force sensor die 10 and signal conditioning within at least one other semiconductor die 34. A further option is integration of force sensing within force sensor die 10 and signal conditioning and signal processing within at least one other semiconductor die.

More options of partitioning of functions are available. For example, input control device 1 can have force sensor die 10 and signal conditioning and signal processing die 34 containing transistor integrated circuit packaged together in one package 22, as it is shown in FIG. 6, and a third die providing wireless communications located outside the package 22.

Mechanical and electrical connections between the force sensing die 10 and the second semiconductor die 34 as well as mechanical and electrical connections of these chips to the package can be established using different approaches. FIG. 6 shows force sensor die 10 having electrical connection elements 18 formed on side one 12 and force application area 16 located on side two 14 of the die 10. The electrical connection elements 18 can be metal pads with under-bump metallization, solder balls, solder bumps or other relevant electrically conductive connections. The electrical connection elements 18, in some embodiments, allow flip-chip mounting of the force sensor die 10 on the second semiconductor die 34. In order to provide mechanical strength of the connection between the force sensor die 10 and the second semiconductor die 34 additional materials and structures can be used at the interface between these two chips. For example, underfill or additional adhesive can be used; additional dummy solder joints can be utilized, mating mechanical microstructures can be formed on the connecting surfaces, etc.

The second semiconductor die 34 has electrical connection elements 36 for electrical connection with the package. The input control device 1 is mounted on a printed circuit board (PCB) 26 or other substrate within electronic system.

Figure 8:
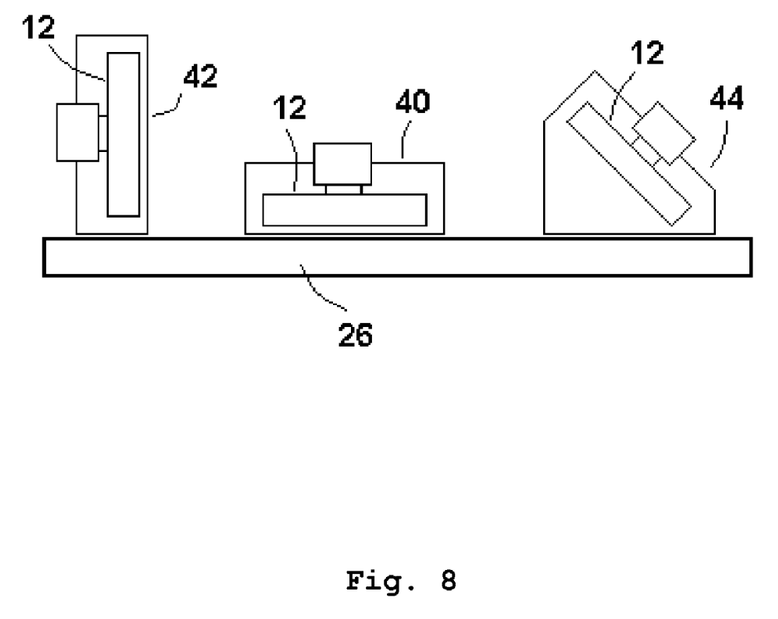
FIG. 8 is a view of an input control device mounted on a printed circuit board (PCB) with different mutual positions of the side one of the force sensor die with respect to the position of the PCB plane.

FIG. 7 shows another option for design and packaging of the force sensor die 10. In the solution shown in FIG. 7, the force sensor die 10 has both electrical connection elements 18 and force application area 16 formed on side one (12). Side two (14) is used for mounting on top of the second semiconductor die 34. In some instances, electrical connection elements 18 of the force sensor die and electrical connection elements 36 of the second semiconductor die 34 are formed suitable for wire bonding Sixth Embodiment FIG. 8 shows different potential orientations of the input control device relative to a PC board 26. Packaged input device 40 is mounted on the PC board 26 in such a way that side one (12) of the force sensor die is parallel to the PCB. Packaged input device 42 is mounted on the PC board 26 in such a way that side one (12) of the force sensor die is perpendicular to the PCB. This type of mounting can be used, for example, when there is a need to have a control button on a sidewall of a handheld device like a cell-phone. In this case the input control device should be mounted close to the edge of the PC board 26. Direct edge-mounting on the PCB typically employs a specialized package in order to provide both reliable mechanical and electrical connection of the input device 42 to the PC board 26. Packaged input device 44 is mounted on the PC board 26 in such a way that side one (12) of the force sensor die is oriented at some acute angle (or obtuse angle depending on orientation) to the PCB 26.

A button (such as the button 32 described with reference to FIG. 5) can be coupled with the input device 40, 42, 44 independent of the type of mounting. However, it can be appreciated that the design of the button 32 is adjusted for each type of input device mounting 40, 42, and 44 in order to provide desired effect and/or maximum convenience for a user.

One of the advantages of the input control devices according to the present embodiments is that they can be constructed in substantially any relevant size depending on an intended implementation, including constructed in relatively very small sizes, such as having dimensions, in some embodiments, in the range of (0.1-10) mm. This allows allocating minimal space in practically any place, such as on the surface of a consumer electronic device and/or handheld device. Again, however, other larger sized input control devices can be constructed when larger sizes are desirable.

Figure 9:
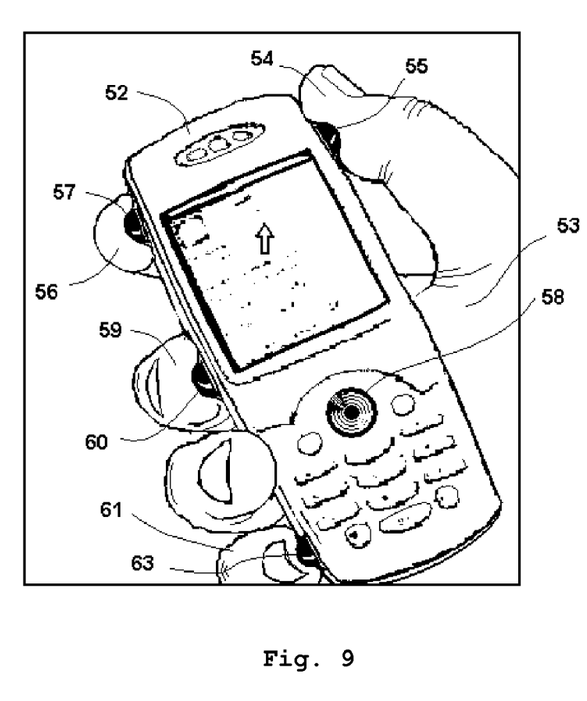
FIG. 9 is a view of a cell phone with different locations of input control devices on the body of the cell phone.

FIG. 9 shows a perspective view of a hand-held device 52, in this example, a wireless or cellular phone that includes multiple input control devices 1. Again, because the input control devices 1 can be constructed in relatively small sizes they can be incorporated in or on substantially any surface of the cell phone 52. For example, an input control device can be placed not only on a front panel of a handheld device, but it also can be placed on a side of a handheld device, as it is shown in FIG. 9. In some instances, it can be advantageous to have at least two basic options of an edge-mounted input control device: on the right side of a handheld device (for a first set of controls and/or for right-handed people) and on the left side of a handheld device (for a second set of controls and/or for left-handed people). The hand-held device 52 shown in FIG. 9 provides multiple input control devices distributed over different locations on the hand-held device 52.

More specifically in this example, FIG. 9 shows a cell phone 52, as an example of a hand-held device that can benefit from the use of force-controlled one-axis or two-axis or three-axis input control devices of the present embodiments. One input control device 58, providing either finger-controlled micro-mouse or micro-joystick functionality, is shown on the front panel of the cell phone 52. Multiple additional input control devices 55, 57, 60 and 63 are also shown that provide similar force-controlled micro-mouse or micro-joystick functionality, which are installed on the side of cell phone 52. In particular, micro-mouse or micro-joystick input control devices 57 and 55 are installed proximate a top portion of the cell phone 52, from the left-hand side and right-hand side, correspondingly. Input control device 57 can be controlled by finger 56 and input control device 55 can be controlled by thumb 54, in the example shown in FIG. 9. In some instances, additional micro-mouse or micro-joystick input control devices 60 and 63 can be installed on other parts of the sidewalls of the cell phone 52, where the micro-mouse or micro-joystick input control devices 60 and 63 can be controlled by the users fingers, such as fingers 59, 61 correspondingly, as shown in FIG. 9.

Figure 10:
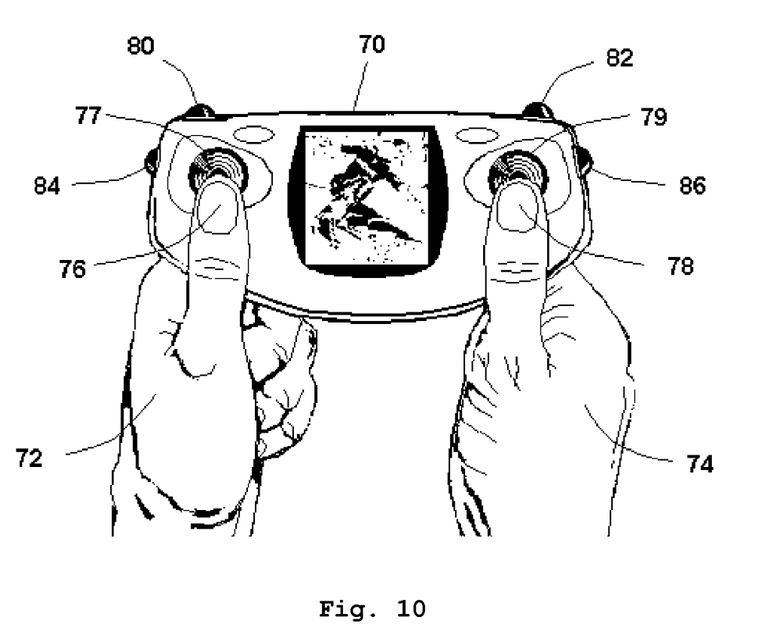
FIG. 10 is a view of a gaming device with different locations of input control devices on the body of the gaming device.

FIG. 10 shows a gaming device 70 as another example of a hand-held device that can benefit from the use of force-controlled one-axis or two-axis or three-axis input control devices of the present embodiments. For example, one or more input control devices can be installed on the front panel of gaming device 70. Two micro-joystick input control devices 77, 79 are shown on the front panel of the gaming device 70. These input control devices 77 and 79 are typically controlled, for example, by thumbs 76 and 78 correspondingly, in the example shown in FIG. 10. Similar force-controlled micro-joystick input control devices can be installed on sidewalls of gaming device 70 as well. FIG. 10 shows micro-joystick input control devices 80, 82 installed on the top portion of the sidewall of the gaming device 70. Micro-joystick input control devices 84, 86 can also be installed on the left and right side walls of the gaming device 70, correspondingly. Micro-joystick input control devices can be installed on other parts of the front panel, back panel and sidewalls of the gaming device 70.

As described in the fourth embodiment, the buttons can be designed ergonomically to provide convenience for the user, typically, the maximum convenience for the user providing preferable material, shape, size, range of the force required to operate the input device, stiffness, maximum deformation, feeling in touch, and color.

A hand-held device, for example, a cell phone 52 or a gaming device 70 can have multiple input control devices of the present embodiments, such as micro-mouse or micro-joystick input control devices or multiple groups of these devices.

Additionally or alternatively, consumer electronic devices (e.g., a hand-held device) can have multiple sockets for input control devices 1, such as finger-controlled micro-joystick input control devices, and these input control devices can be mounted and re-mounted in the different sockets and/or in different consumer electronic devices.

Furthermore, micro-mouse and micro-joystick input control devices can have programmable functionality and selectable sensitivity. For example, in a gaming device having two three-axis micro-joysticks input control devices (e.g., input control devices 77 and 79) can allow controlling six independent parameters.

The described three-axis input control devices 1, such as finger or thumb-controlled micro-mouse, micro-joystick devices and other such devices, can provide capabilities of controlling up to three independent functions. For example, two functions can control moving an object on the screen of cell phone, gaming device or other consumer electronic or hand-held device in any direction. Typically a speed of motion can be proportional to the applied force. The third function of the input control devices 1 can serve, for example, as an action button. These advantages of finger or thumb-controlled micro-mouse or micro-joystick devices provide superior functionality compared to a 4-way button widely used in cell phones and other hand held electronic devices. Furthermore, above described options of placement and flexibility in assigning and programming functionality of the input control devices 1 (such as micro-mouse or micro-joystick control devices) bring additional value to the electronic systems utilizing these types of input control devices.

Similarly, the one, two and/or three-axis force sensors of the present embodiments can be incorporated into substantially any device, system and apparatus that can be controlled by an applied force as an input. As introduced above in the two examples, one or more one or multi-axis force sensors of the subject embodiments can be incorporated into a wireless phone 52 and a gaming device 70, as well as being incorporated at a variety of locations on the wireless phone 52 and/or gaming device 70 (e.g., front, back, top, bottom, left side, right side, front panel, edge, control panel, control area, sidewall and the like). Furthermore, the one or multi-axis force sensors can be incorporated into numerous other devices and systems, such as but not limited to, consumer electronic devices {portable multimedia and/or audio player (e.g., radio, MP3 player, compact disc (CD) player, digital versatile disc (DVD) player, and other such players), computers, printers, copiers, scanners, keyboards, mice, telephones, televisions, DVD players, Blu-ray players, stereos, remote controls, gaming controllers for PlayStation, X-Box, Nintendo Wii and the like, portable game playing devices, and other consumer electronic devices};

appliances {microwave ovens, ovens, stove-tops, clothes washers, clothes driers, dishwashers, refrigerators, vacuum cleaners and other such devices};

transportation {controls for navigation/GPS systems, radios, cruse control, including controls incorporated on a steering wheel in automobiles, boats, aircrafts, trains and in numerous other types of transportation};

medical equipment {prostheses, blood pressure meters, hearing aid devices, patient condition monitoring and alarm devices, rehabilitation devices, dentistry and other systems and devices};

military equipment; robotics; sport equipment; education; toys and other devices that receive input through a force.

Due to the broad range of applications, the input control devices 1 can be incorporated in substantially any location of the device or system to provide convenient use, including but not limited to: front, back, top, bottom, left side, right side, front panel, edge, control panel, control area, sidewall, handle, external surface, inside the object and/or combinations of the above.

It should be understood that the microstructures of the die, structures of the packages, buttons, methods of their mounting and materials used do not limit the present invention, but only illustrate some of the various technical solutions covered by this invention. While the invention has been described in detail with reference to some embodiments, it is understood that variations and modifications thereof may be made without departing from the true spirit and scope of the invention.

What is claimed is:

1. Semiconductor input control device for inputting mechanical signals into an electronic system comprising:
    a force sensor die formed within a semiconductor substrate, the force sensor die comprises side one and side two, electrical connection elements, force-application area and at least one force sensor providing electrical output signals in response to an external force applied to the force-application area;
    a package enclosing at least part of the force sensor die; and
    a force-transferring element cooperated with the force-application area, where the force transferring element transfers an external force to the force sensor die;
    wherein the electrical connection elements and force-application area of the force-sensor die are located on the side one of the force sensor die and the force-transferring element is in contact with the force application area on the side one of the force sensor die when the external force is applied.

2. A device according to claim 1, wherein the external force is applied directly to the force-transferring element of the package.

3. A device according to claim 2, wherein the force sensor die is flip-chip mounted within the package.

4. A device according to claim 1, wherein the force sensor die has a force-transferring element coupled to the force-transferring element of the package for better and multi-axis sensitivity of the device.

5. A device according to claim 4, wherein the force-transferring element of the force sensor die is made from materials chosen from the group of: metal, alloy, plastic, rubber, silicon, ceramic, glass, or combination of the above.

6. A device according to claim 1, wherein the force-transferring element of the package is made from materials chosen from the group of: one layer uniform material, at least two layers of uniform materials, non-uniform material with gradient of hardness or combination of the above.

7. A device according to claim 1, wherein the package is mounted on a PCB and mechanical coupling to the PCB is chosen from the group of: soldering, underfill adhesive, adhesive applied around the sidewalls of the package and PCB surface, metal bracket or combination of the above.

8. A device according to claim 1, wherein the force sensor die is wire bonded within the package.

9. Semiconductor input control device for inputting mechanical signals into an electronic system comprising:
    a force sensor die formed within a semiconductor substrate, the force sensor die comprising side one and side two, electrical connection elements, a force-application area, and at least one force sensor providing electrical output signals in response to an external force applied to the force-application area; and
    a package enclosing at least part of the force sensor die, the package comprising a force-transferring element that transfers an external force to the force sensor die;
    wherein the electrical connection elements are located on the side one of the force sensor die, the force-application area is located on the side two of the force sensor die and the force-transferring element is in contact with the force application area on the side two of the force sensor die when the external force is applied.

10. Semiconductor input control device for inputting mechanical signals into an electronic system comprising:
    a force sensor die formed within a semiconductor substrate, the force sensor die comprising side one and side two, electrical connection elements, a force-application area and at least one force sensor providing electrical output signals in response to an external force applied to the force-application area;
    transistor integrated circuit formed within a semiconductor substrate, the transistor integrated circuit being electrically coupled with the at least one force sensors to receive the electrical signals;
    a package enclosing at least part of the force sensor die; and
    a force-transferring element that is cooperated with the force sensor die, where the force-transferring element transfers an external force to the force sensor die;
    wherein the transistor integrated circuit provides signal conditioning and signal processing of the electrical output signals from the at least one force sensor.

11. A device according to claim 10, wherein electrical connection elements of the force sensor die are exposed for direct mounting of the semiconductor input control device within an electronic system.

12. A device according to claim 10, wherein the device has at least N force sensors, where N is less than four, said at least N force sensors provide independent electrical output signals containing information about N components of the external force vector.

13. A device according to claim 10, wherein said semiconductor input control device is mounted on a printed circuit board (PCB) such that the mutual position of the side one of the force sensor die with respect to the position of the PCB plane is chosen from the group of mutual positions including: parallel, perpendicular or not parallel.

14. A device according to claim 10, further comprising a button that provides an interface with the external force and transfers the external force to the force-transferring element, such that the force-transferring element transfers the external force to the force sensor die.

15. A device of claim 14, wherein the button has a connector that cooperates the button with the force-transferring element, wherein said connector is configured to allow the button to be replaced.

16. A device of claim 14, wherein the button is integrated in a control panel chosen from the group including one or more of: keyboard, key-mat, control surface area and combination of the above.

17. A device according to claim 10, wherein said device is mounted on an object in the location chosen from the group of: front, back, top, bottom, left side, right side, front panel, edge, control panel, control area, sidewall, handle, steering wheel, external surface, inside the object or combination of the above.

18. A device according to claim 10, wherein one or more of the at least one force sensors, providing the electrical output signal in response to the external force applied to the force-application area, is chosen from the group of: a piezoresistor, a pn-junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit, a piezoelectric sensor, a capacitor, a differential capacitor, a capacitive bridge, a magnetic sensor, an electro-magnetic sensor, a magneto-electric sensor, an optical sensor, a pair of radiation emitting and radiation sensitive component, a vibration sensor, an acoustic wave sensor, a thermal sensor, a heat transfer sensor or combination.

19. A device according to claim 10, wherein the electrical connection elements are chosen from the group of: metal contact pads for wire-bonding, metal pads for flip-chip bonding, solder balls, solder bumps, through silicon vias, beam leads or combination.

20. A device of claim 10, wherein the signal conditioning and signal processing of the electrical output signals provided by the transistor integrated circuit comprises a partitioning between force sensing, signal conditioning and signal processing functions chosen from the group including: integration of force sensing, signal conditioning and signal processing functions within one force sensor die; integration of force sensing and at least some signal conditioning within force sensor die and at least signal processing within at least one other die; integration of force sensing within force sensor die and signal conditioning within at least one other die; integration of force sensing within force sensor die and signal conditioning and signal processing within at least one other die.

21. A device of claim 10, wherein the transistor integrated circuit is located within the package of the semiconductor input control device.

22. A device of claim 10, wherein the transistor integrated circuit is chosen from the group of: CMOS, bipolar, and biCMOS.

23. A device of claim 10, wherein electrical connection elements are located on the side one, force-application area is located on the side two of the force sensor die and the force-transferring element is coupled to the force application area on the side two of the force sensor die.

24. A device of claim 10, wherein electrical connection elements and force-application area of the force-sensor die are located on the side one of the force sensor die and the force-transferring element is coupled to the force application area on the side one of the force sensor die.

* * * * *